United States Patent [19]

Uchimura et al.

[11] Patent Number: 4,778,016

[45] Date of Patent: Oct. 18, 1988

[54] WEIGHING METHOD BY MULTIRANGE LOAD CELL BALANCE

[75] Inventors: Mitsuo Uchimura; Tsutomu Masuyama, both of Shizuoka, Japan

[73] Assignee: Tokyo Electric Co., Ltd., Tokyo, Japan

[21] Appl. No.: 906,498

[22] Filed: Sep. 12, 1986

[30] Foreign Application Priority Data

Sep. 17, 1985 [JP] Japan .................................. 60-204845

[51] Int. Cl.$^4$ ...................... G01G 23/14; G01G 23/06
[52] U.S. Cl. ..................................... 177/164; 177/186
[58] Field of Search ................. 177/211, 229, 186, 164

[56] References Cited

U.S. PATENT DOCUMENTS

| | | | |
|---|---|---|---|
| 4,037,675 | 7/1977 | Storace et al. ....................... | 177/229 |
| 4,307,787 | 12/1981 | Raboud et al. .................. | 177/211 X |
| 4,375,243 | 3/1983 | Doll ..................................... | 177/211 |
| 4,660,160 | 4/1987 | Tajima et al. .................... | 177/185 X |

Primary Examiner—George H. Miller, Jr.
Attorney, Agent, or Firm—Oblon, Fisher, Spivak, McClelland & Maier

[57] ABSTRACT

A load is applied simultaneously to a plurality of load cells having mutually different optimal weighing ranges and connected to each other, so that load data are obtained individually from such load cells. The data of the weighed load are processed for prevention of display blinking, and the output of the load cell selected with respect to a predetermined switchover point on the basis of the processed load data is displayed, whereby the data once displayed is kept free from blinking to eventually realize a stable display state.

6 Claims, 4 Drawing Sheets

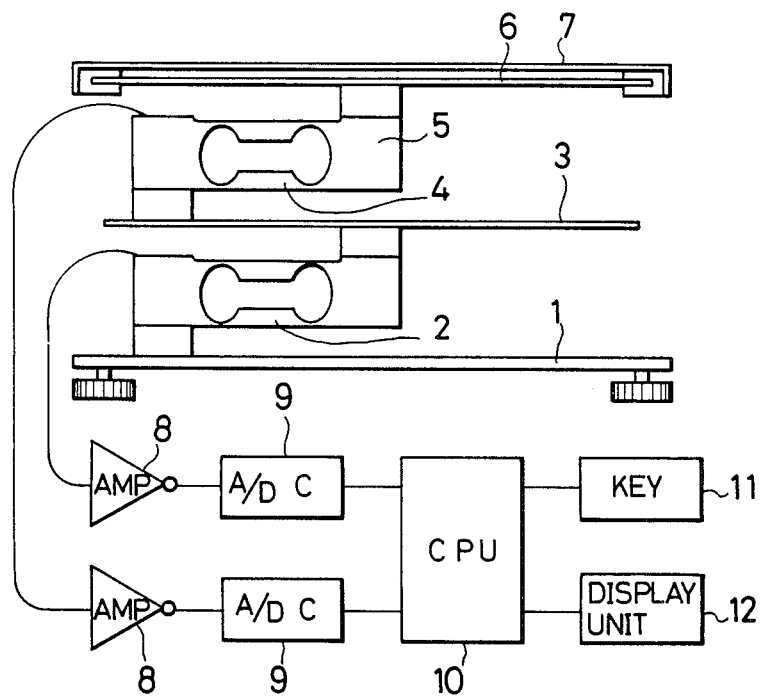

WEIGHING METHOD BY MULTIRANGE LOAD CELL BALANCE

FIELD OF THE INVENTION AND RELATED ART STATEMENT

The present invention relates to a weighing method using load cells and, more particularly, to a weighing method by a multirange load cell balance which selectively displays the output of an optimal one of load cells whose optimal weighing ranges are different from each other.

In the conventional multirange load cell balance known heretofore, generally a lower-level load cell and an upper-level load cell having mutually different values of graduations are connected to each other, and a load is applied simultaneously to both load cells. In this structure, the output of the lower-level load cell is displayed when the load is below a predetermined switchover point, while the output of the upper-level load cell is displayed when the load is above such point, whereby weighing and display are performed in accordance with the characteristic of each load cell to consequently enable extension of the overall weighing range.

The weighing method by the above multirange load cell balance will now be described in detail with reference to the flow chart of FIG. 5. First a weighing operation is started by applying a load to two load cells. Each load cell thus strained by the load produces an output conforming thereto. The output is then amplified, digitized and fed to a CPU, which detects whether the output of the load cell is in excess of a predetermined switchover point or not. The switchover point is at a boundary between the respective optimal weighing ranges of the two load cells. In case the output of each load cell does not exceed the switchover point, the output of the lower-level load cell is displayed after being processed for blinking prevention. Meanwhile, if the output of each load cell exceeds the switchover point, the output of the upper-level load cell is displayed after being processed for blinking prevention.

In the conventional techniques mentioned above, there exist the following problems. The data judged to be above or below the switchover point is the output of the load cell fed to the CPU, i.e. the raw data prior to display blinking prevention. Accordingly, in case the data value is in the vicinity of the switchover point, the value is prone to vary over and under the switchover point, since display blinking is induced in the raw data due to the change with passage of time. Thus, when the data value to be judged with respect to the switchover point has varied over or under such point, there occurs blinking in the finally displayed value even with the blinking prevention function executed after judgment relative to the switchover point.

OBJECT AND SUMMARY OF THE INVENTION

It is an object of the present invention to provide an improved weighing method by a multirange load cell balance capable of effecting stable display without blinking.

In order to achieve the object mentioned above, the present invention is so contrived as to first process the weighed load data for prevention of display blinking and then to display the output of a load cell selected with respect to a predetermined switchover point on the basis of the load data processed already for prevention of such display blinking. Therefore the judgment on whether the load cell output is above or below the switchover point is executed on the basis of the stable data processed to prevent the display blinking, so that the selected load cell is not switched over to the other load cell unless the applied load is substantially changed. Accordingly the blinking of the display value can be prevented to attain a stable display.

BRIEF DESCRIPTION OF THE DRAWINGS

FIG. 2 is a partial side view of an apparatus for carrying out the invention;

FIG. 3 is a RAM map designed for prevention of display blinking;

DETAILED DESCRIPTION OF PREFERRED EMBODIMENT

Figure 1:
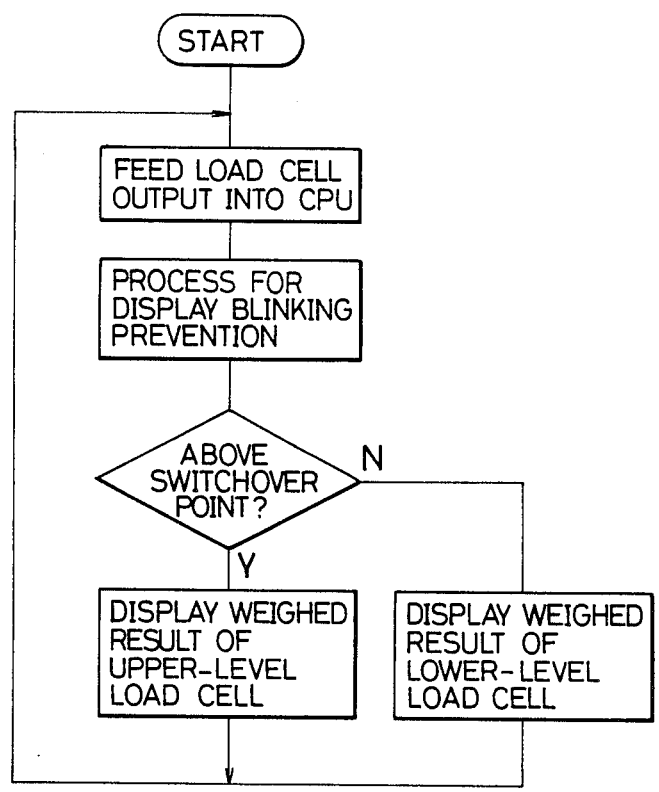
FIG. 1 is a flow chart representing an exemplary embodiment of the present invention.

Hereinafter an exemplary embodiment of the present invention will be described with reference to FIGS. 1 through 4. On a plate-shaped base 1, there is mounted an upper-level load cell 2 whose one end is coupled thereto, and one end of a lower-level load cell 4 is coupled through a frame 3 to the other end of the upper-level load cell 2. The upper-level load cell 2 has an optimal weighing range on a heavy-weight side, while the lower-level load cell 4 has an optimal weighing range on a light-weight side. The upper-level load cell 2 and the lower-level load cell 4 have mutually different values of graduations. A scale mount frame 6 is coupled to a free end 5 of the lower-level load cell 4, and a scale 7 is mounted on the frame 6.

The upper-level load cell 2 and the lower-level load cell 4 are connected to a CPU 10 through an amplifier (hereinafter referred to as AMP) 8 and an analog-to-digital converter (hereinafter referred to as A/D C) 9, respectively. And to the CPU 10 are connected a key 11, a display unit 12 and two RAMs 13.

When an article to be weighed is placed on the scale 7 in the structure mentioned above, each of the upper-level load cell 2 and the lower-level load cell 4 is deformed and produces an electric output corresponding to the amount of such deformation. The individual output data is amplified by the AMP 8, digitized by the A/D C 9 and is fed into the CPU 10. Subsequently the output data of either the upper-level load cell 2 or the lower-level load cell 4 is selected in the CPU 10 and then is displayed by the display unit 12.

The procedure of selecting the output data in the CPU 10 will now be described with reference to the flow chart of FIG. 1. First the output data of the upper-level load cell 2 and the lower-level load cell 4 fed into the CPU 10 are processed for prevention of display blinking so as to stabilize the judgment relative to the switchover point. An explanation on such display blinking prevention will be given later. Then the output data of the lower-level load cell 4 already processed for such prevention is judged to be above or below the switchover point, and the output data of either load cell is selected according to the result of the judgment. In case the output data of the lower-level load cell 4 is judged to be below the switchover point, the output data of the lower-level load cell 4 is selected. To the contrary, if it is judged to be above the switchover point, the output data of the upper-level load cell 2 is selected. And the output data thus selected is displayed by the display unit 12.

In this manner the judgment on whether the output data of the lower-level load cell 4 is above or below the switchover point is executed on the basis of the high-stability output data already processed for prevention of display blinking, so that even when the output data value is in the vicinity of the switchover point, frequent switchover of the output data is averted. And consequently the frequency of switching the selected load cell over to the other is reduced to prevent display blinking on the display unit 12. Furthermore, since the output data of the selected load cell has already been processed for prevention of display blinking, the blinking on the display unit 12 can be averted to eventually realize high stability in the display unit 12.

Figure 4:
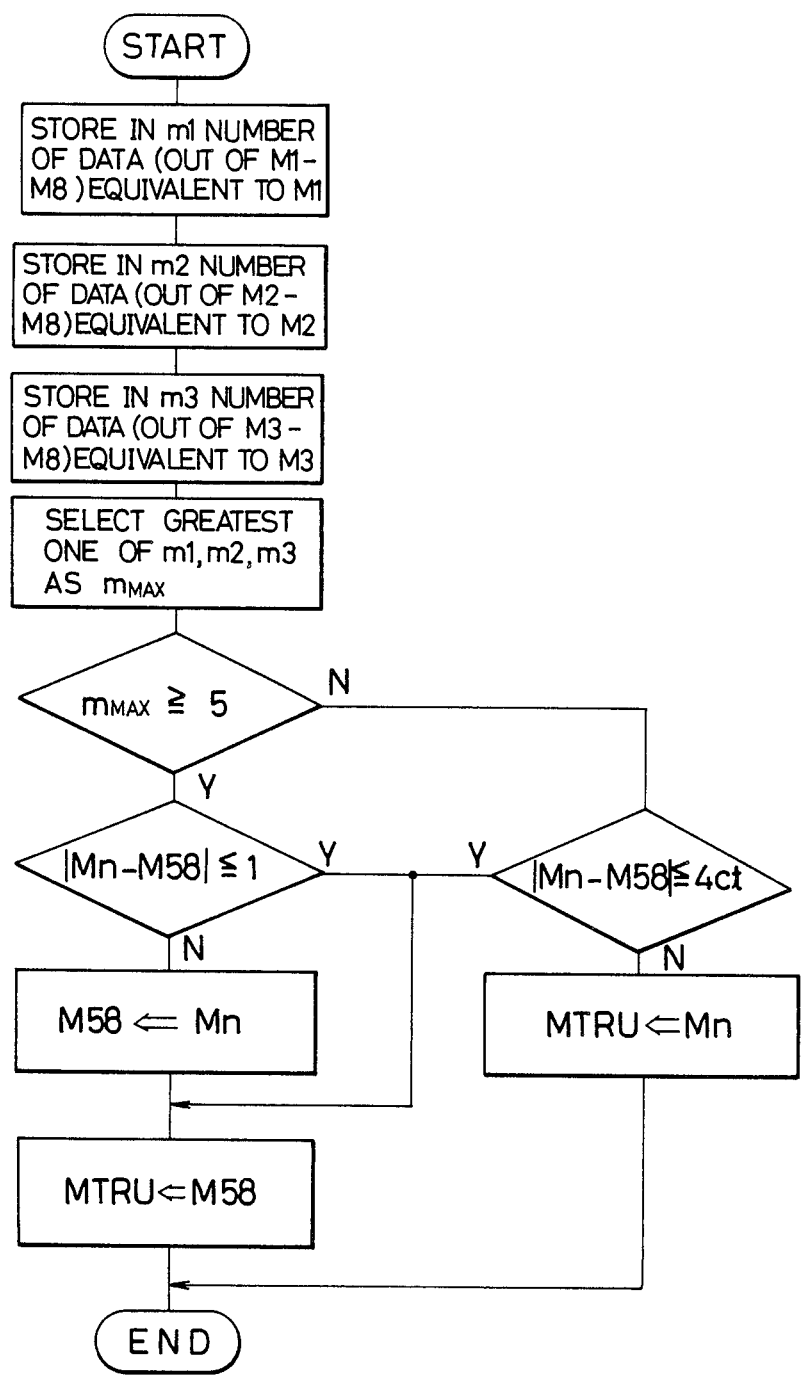
FIG. 4 is a flow chart showing how display blinking prevention is executed.
Figure 5:
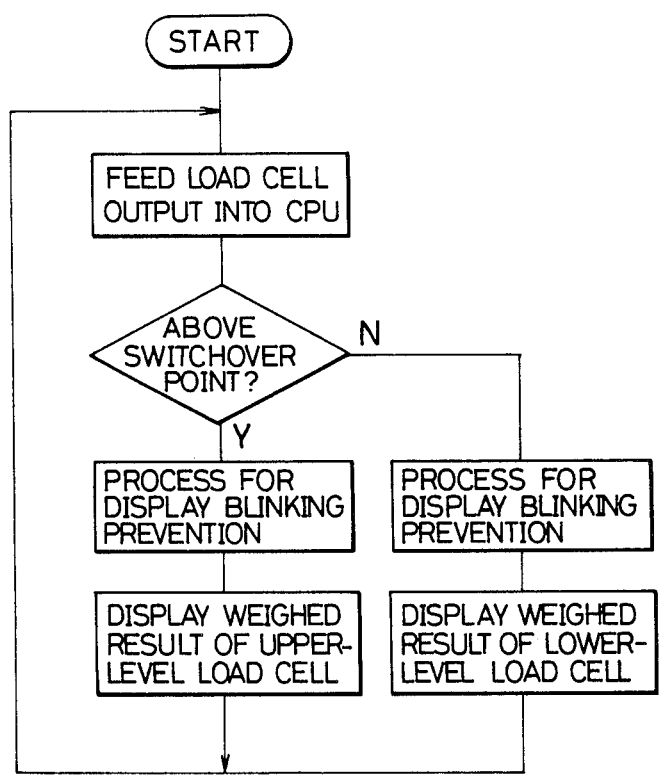
FIG. 5 is a flow chart representing a conventional example.

The procedure of such display blinking prevention will now be described below with reference to FIGS. 3 and 4. FIG. 3 is a RAM map designed for prevention of display blinking with the employment of RAMs 13, and FIG. 4 is a flow chart showing how display blinking prevention is executed. One RAM 13 is used for the upper-level load cell 2 while the other RAM 13 is used for the lower-level load cell 4. The raw output data of the two load cells are sampled eight times with the passage of time and are stored as M1–M8 in the respectively associated RAMs 13. More specifically, the latest data is inputted to M1 so that the data M1–M7 preceding the latest data are shifted one by one to M2–M8, and M8 is erased. Out of M1–M8, the number of the data equivalent to M1 is stored as m1, the number of the data equivalent to M2 is stored as m2, and the number of the data equivalent to M3 is stored as m3. And the greatest number out of m1, m2 and m3 is stored as mMAX. In case five or more of the data M1–M8 are of the same value, such value is stored in M58. And the data processed for display blinking prevention are stored in MTRU.

Whether mMAX is more or less than five is detected to check if the raw data is stable to a certain extent. In either case, the preceding data and the present data are compared with each other. The preceding data is the one stored as M58 finally in the past, and the present data is the one stored as M1, M2 or M3 related to mMAX at the present moment. The present data is designated by Mn. Hereinafter a description will be given on two cases where mMAX is greater and smaller than five.

When mMAX is greater than five, a step is executed to detect whether the difference between the preceding data and the present data is less than one count. Anf if the difference is less than one count, the preceding data is stored in MTRU to be regarded as the data processed for display blinking prevention. Meanwhile, if the difference is more than one count, the present data is stored in MTRU to be regarded as the data processed for display blinking prevention. At this time the data Mn is inputted to M58.

When mMAX is smaller than five, a step is executed to detect whether the difference between the preceding data and the present data is less than four counts. And if the difference is less than four counts, the preceding data is stored in MTRU to be regarded as the blinking-prevention processed data. Meanwhile, if the difference is more than four counts, the present data is stored in MTRU to be regarded as the blinking-prevention processed data, signifying that the load is varying. At this time the data Mn is not inputted to M58, because the load variation is great and Mn is not adequate to be used as reference data for the next blinking prevention.

In carrying out the method of this invention, three or more load cells having mutually different optimal weighing ranges may be connected to one another.

What is claimed is:

1. A weighing method by a multirange load cell balance, comprising the steps of:
    applying a load simultaneously to a plurality of load cells having mutually different optimal weighing ranges and connected to each other, thereby obtaining load data from said load cells respectively; processing the data of the weighed load for each load cell separately for prevention of display blinking; and displaying the separately processed load data of the load cell selected with respect to a predetermined switchover point on the basis of said separately processed load data.

2. The method as defined in claim 1, wherein said load cells consist of an upper-level load cell and a lower-level load cell, and the switchover point is judged on the basis of the load data obtained from said lower-level load cell.

3. A method of weighing a load using a multirange load cell balance comprising the steps of:
    applying the load simultaneously to a plurality of load cells, each of said cells having different optimal weighing ranges and producing a load data output;
    converting the load data output from each of said cells to a corresponding digital data output;
    processing each digital data output separately to stabilize the data value and prevent blinking;
    comparing the processed data with respect to a predetermined switchover point to determine the appropriate load cell and processed data to be utilized; and
    displaying the selected processed data.

4. A method of weighing according to claim 3, wherein the step of processing the digital data includes the steps of:
    storing a plurality of sampled digital data from each load cell;
    determining the number of stored data equal in value to a first one of said plurality of stored data;
    determining when said number is sufficiently high to indicate that the data has stabilized.

5. A method of weighing according to claim 4, wherein said step of processing digital data further includes the step of comparing the current value of said first data with the immediately preceding in time value of said first data to determine the amount of movement of said value.

6. The method of weighing a load using a multirange load cell balance comprising the steps of:
    applying the load simultaneously to a plurality of load cells, each of said cells having different optimal weighing ranges and producing a load data output;
    converting the load data output from each of said cells to a corresponding digital data output;
    processing each digital data output to stablize the data value and prevent blinking, including storing a plurality of sampled digital data from each load cell; determining the number of stored data equal in value to a first one of said plurality of stored data; determining when said number is sufficiently high to indicate that the data has stabilized; determining for additional ones of said plurality of stored data the number of stored data equal in value; and comparing the number of data having a value equal to said first data and the number having the same value as said other data to determine which number is largest;

comparing the processed data with respect to a predetermined switchover point to determine the appropriate load cell and processed data to be utilized; and displaying the selected processed data.

* * * * *